United States Patent [19]

Tesch

[11] Patent Number: 4,814,229

[45] Date of Patent: Mar. 21, 1989

[54] SPHERICAL FIBER AGGREGATE

[75] Inventor: Gunter Tesch, Avenue Jean-Marie-Musy 15, CH-1700 Fribourg, Switzerland

[73] Assignee: Gunter Tesch, Fribourg, Switzerland

[21] Appl. No.: 89,404

[22] Filed: Aug. 26, 1987

[30] Foreign Application Priority Data

Aug. 29, 1986 [CH] Switzerland ........................ 03469/86

[51] Int. Cl.[4] ................................................ B32B 5/16

[52] U.S. Cl. .................................... 428/402; 428/218; 428/220; 428/222; 428/227; 428/234; 428/284; 428/357; 428/369; 428/370; 428/371

[58] Field of Search ............... 428/369, 370, 371, 218, 428/222, 220, 227, 234, 284, 85, 90, 402, 357

[56] References Cited

U.S. PATENT DOCUMENTS 4,413,030 11/1983 Tesch et al. .......................... 428/85

4,481,247 11/1984 Tesch et al. .......................... 428/234

*Primary Examiner*—Sharon A. Gibson

*Attorney, Agent, or Firm*—Bacon & Thomas

[57] ABSTRACT

A spherical fiber aggregate having an inner core and outer covering, in particular as a filler material for cushions and covers wherein individual filaments or fibers are intertwined, is characterized in that the core of the fiber aggregate contains filaments or fibers different from those of the covering. In this manner spherical fiber aggregates are created, which combine different properties, and in particular are capable of absorbing humidity when used as a filler material, and therefore contain natural fibers, while on the other hand they do not lose their down-like properties, such as high bulk, compressive elasticity, softness, thermal insulation ability, light weight and ready adaptation to the body to be covered.

10 Claims, No Drawings

SPHERICAL FIBER AGGREGATE

This invention concerns a spherical fiber aggregate, particularly as a filler material for cushions and covers, in which individual filaments or fibers are wound.

A filler material of molded articles with a round cross-section is known from DE-B No. 2 301 913. This filler material comprises molded spherical fiber aggregates, with individual filaments having a minimum length of 200 mm being used to produce the individual fiber aggregates. During the manufacture of the spherical fiber aggregates, the filaments are separated from each other by a flow of gas, blown into a vessel with perforated walls, collected therein and rotated by eccentrically blowing a flow of gas into a vessel while forming the spherical molded article. A fiber aggregate is formed in this manner, which in its spatially outer areas has a higher density than in the core area.

Synthetic fibers of polyamide, polyester, polyacrylic acid, polyvinyl alcohol, polyvinylidene chloride, polyurethane or polyvinylchloride are used for this aggregate. Mixtures of different synthetic fibers may also be used, the fibers differing, in particular, in their thermoplastic properties. Due to the mutual fastening of the filaments at their points of contact, these known aggregates cannot hook into or penetrate each other. Although such fiber aggregates have properties that are similar to (elder) down with respect to their great bulk, compressive elasticity, softness, thermal insulating characteristics, light weight and good adaptation to the body to be covered, they cannot be considered equivalent replacement for down, as they lack the liquid absorption ability of down.

A further fiber aggregate is known from EP-A No. 0.013.427 which corresponds to U.S. Pat. No. 4,413,030. This aggregate consists of spherically intertwined or rolled fibers. These aggregates are pourable and may be rolled and may contain natural fibers, such as cotton or wool fibers, animal hair such as goat hair, fur hair, or the like, or synthetic fibers or a mixture of them. These known aggregates have densities suitable for needle processing and according to EP-A No. 0.013.427 may be needle bonded when placed in a layer, to each other and/or to a support layer, thereby forming a textile sheet material.

These fiber aggregates have been found suitable in particular for the production of carpets or the like. In principle, they may also be used as filler materials for cushions, covers or the like. If, however, synthetic fibers are used to form such aggregates, the aggregates usually cannot absorb any humidity. Aggregates with natural fibers, such as wool or the like, are able to absorb relatively large quantities of humidity, but felt very rapidly whereby they not only form lumps in themselves, but also connect with adjacent aggregates, whereupon the individual aggregates and the filler as a whole no longer retain the elastic properties present at the outset. Consequently, these fiber aggregates are less suitable as filler materials for cushions and covers, in particular for beds.

It is therefore an object of this invention to create a spherical fiber aggregate of the aforedescribed generic type, which combines a variety of properties, in particular, firstly, the ability to absorb humidity as a filler material and thus to contain natural fibers, and secondly not to lose their down-like properties, such as high bulk, compressive elasticity, softness, thermal insulating ability, light weight and ready adaptation to the body to be covered. This object is attained by the fiber aggregate according to the invention which comprises an inner core and outer covering which is characterized in that different fibers are placed in the core and the covering of the aggregate. In this manner, the fibers of the core may be assigned functions different from those of the aggregate covering.

The fibers of the covering may consist of natural fibers, while the core fibers are synthetic. In view of the outer natural fibers, the fiber aggregate appears from the outside to consist entirely of natural fibers, which is important in particular if the aggregates come into contact with the human skin directly or indirectly through the material containing fiber aggregates. The synthetic fibers located inside can then perform essentially the function of supporting the outer natural fibers.

It is, however, equally possible to provide the fibers of the covering essentially with mechanical properties, while the fibers in the core essentially perform the tasks of liquid absorption and thermal insulation. Accordingly, in a further embodiment of the invention natural fibers, such as, for example, cotton or sheep's wool fibers, are placed in the core, while synthetic, and in particular stiff fibers, are provided for the covering.

These synthetic fibers should be water repellent and thus polypropylene fibers are especially suitable.

The core of the fiber aggregates may contain further fine, in particular humidity absorbing fibers, while the covering of the aggregate contains coarse, water repellent fibers.

Conversely, the core of the fiber aggregates may contain coarse fibers in the core and fine fibers in the covering.

To join the covering of the aggregate durably with the core, the covering advantageously contains fibers penetrating the core; these fibers are in particular needled into the core by known needling processes.

Fiber aggregates of the invention may also be prepared winding different fibers around the fiber aggregate forming the core in a second, known balling process step.

I claim:

1. A spherical fiber aggregate comprising a spherical inner core and a spherical outer covering as a filler material for cushions and covers, in which individual filaments or fibers are wound together, characterized in that different filaments or fibers are placed in the core of the fiber aggregate than in its covering.

2. A spherical fiber aggregate according to claim 1, wherein coarse fibers are placed in the core and fine fibers in the covering.

3. A spherical fiber aggregate according to claim 1, wherein the covering is joined to the core by fibers of the aggregate.

4. A spherical fiber aggregate according to claim 1, wherein the fibers of the covering penetrate into the core.

5. A spherical fiber aggregate according to claim 1, wherein natural fibers are placed in the core and synthetic fibers in the covering.

6. A spherical fiber aggregate according to the preceding claim, wherein the core contains wool fibers and the covering contains polypropylene fibers.

7. A spherical fiber aggregate according to claim 1, wherein synthetic fibers are placed in the core and natural fibers in the covering.

8. A spherical fiber aggregate according to claim 4, wherein the fibers of the covering are needled into the core.

9. A spherical fiber aggregate according to claim 1, wherein the fibers used in the covering are liquid repellant, while the fibers of the core absorb liquids.

10. A spherical fiber aggregate according to claim 1, wherein fine fibers are placed in the core and coarse fibers in the covering.

* * * * *